July 16, 1929.    H. ROHWER    1,721,040
DIESEL ENGINE
Filed Nov. 15, 1927
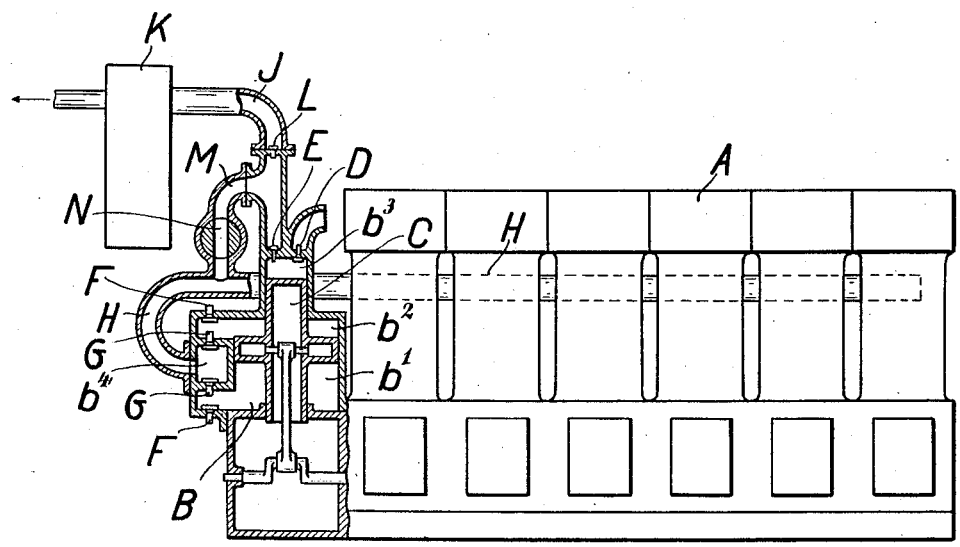
Inventor:
Heinrich Rohwer
By Knight Brothers
attys.

Patented July 16, 1929.

1,721,040

UNITED STATES PATENT OFFICE.

HEINRICH ROHWER, OF KIEL, GERMANY, ASSIGNOR TO FRIED. KRUPP GERMANIA-WERFT AKTIENGESELLSCHAFT, OF KIEL-GAARDEN, GERMANY.

DIESEL ENGINE.

Application filed November 15, 1927, Serial No. 233,510, and in Germany November 22, 1926.

This invention relates to Diesel engines operating without a compressor and having a charging pump for supplying supplemental charging air in order to increase the capacity of the engine, and an air pump for delivering the starting and braking air. The object of this invention is to provide a particularly advantageous arrangement, which occupies but little space, of these two pumps, this being of special importance in locomotive engines. This object is attained according to my invention by combining with the charging pump a pump for producing the starting and braking air in such a manner, that a common differential piston serves both pumps, and by providing a throw-over member, by means of which, the braking air pump may be connected selectively to the compressed air receiver for the starting and braking air or to the supplemental charging air piping.

The invention is illustrated in the accompanying drawing by way of example.

A denotes a six cylinder Diesel engine operating without a compressor, to which is attached a combined charging and braking air pump B actuated from the crank shaft of the machine. The piston C of the air pump B is constructed as a differential plunger and forms with the housing of pump B three working chambers $b^1$, $b^2$ and $b^3$. The chambers $b^1$ belong to the charging pump, while the chamber $b^3$ forms the working space of the starting and braking air pump. In the cover of the pump housing are provided the suction valve D and the pressure valve E for the pump chamber $b^3$. The suction valves F and the pressure valves G for the pump chambers $b^1$ and $b^2$ are arranged in lateral pockets of the housing of pump B. The pressure valves G open into a common pressure chamber $b^4$, to which is connected the pipe H for the supplemental charging air. Pipe H leads to the supplemental charging members (not shown) of the individual cylinders of the engine. The pressure valve E of the pump chamber $b^3$ for the starting and braking air opens into a pipe J, to which is connected the receiver K for the starting and braking air. A check valve L opening toward the receiver K is arranged in the pipe J. A pipe M branches off from pipe J before this check valve and opens into the supplemental charging air pipe H. In the pipe M there is arranged a throw-over member N, by means of which the braking air pump may be connected selectively to the compressed air receiver for the starting and braking air or to the supplemental charging air pipe.

In the open position, as shown in the drawing, of the throw-over member N, all said pump chambers $b^1$, $b^2$, $b^3$ deliver into the supplemental charging air pipe H. The entire air supplied is thus employed as supplemental charging air to increase the capacity of the engine A. As the pressure of the supplemental charging air is considerably lower than the normal pressure of the starting air in the receiver K, the check valve L remains closed. When, however, the pressure in the receiver K has been lowered so far, due to starting or braking operations, that the receiver K has to be re-filled, the throw-over member N is closed. The air delivered into the chamber $b^3$ is now supplied, through the pressure valve E, check valve L and pipe J, to the compressed air receiver K. When the receiver K has been re-filled sufficiently, the throw-over member N is opened anew, and the air delivered into the chamber $b^3$ is again used as supplemental charging air.

What I claim and desire to secure by Letters Patent, is:—

1. In a Diesel engine a starting and braking air pump and a supplemental charging air pump, said two pumps having a common differential piston adapted to produce starting and braking air by one of its surfaces and supplemental charging air by its other surface, and means for enabling said first-named air to be temporarily added to said last-named air.

2. In a Diesel engine a starting and braking air pump and a supplemental charging air pump, said two pumps having a common differential piston having two surfaces and adapted to produce starting and braking air by its smaller surface and supplemental charging air by its larger surface, and means for enabling said first-named air to be temporarily added to said last-named air.

3. In a Diesel engine a starting and braking air pump and a supplemental charging air pump, said two pumps having a common differential piston adapted to produce starting and braking air by one of its surfaces and supplemental charging air by its other surface, a receiver for said first-named air connected to said pump, means for enabling said first-named air to be temporarily added to said last-named air, and a check valve arranged between said pump and said receiver and opening toward the latter.

4. In a Diesel engine a starting and braking air pump and a supplemental charging air pump, said two pumps having a common differential piston having two surfaces and adapted to produce starting and braking air by its smaller surface and supplemental charging air by its larger surface, a receiver for said first-named air connected to said pump, means for enabling said first-named air to be temporarily added to said last-named air, and a check valve arranged between said pump and said receiver and opening toward the later.

The foregoing specification signed at Hamburg, this 26th day of October, 1927.

HEINRICH ROHWER.